C. T. BOTTS.
Straw Cutter.
No. 58. A. 1 Patented Oct. 12, 1842.
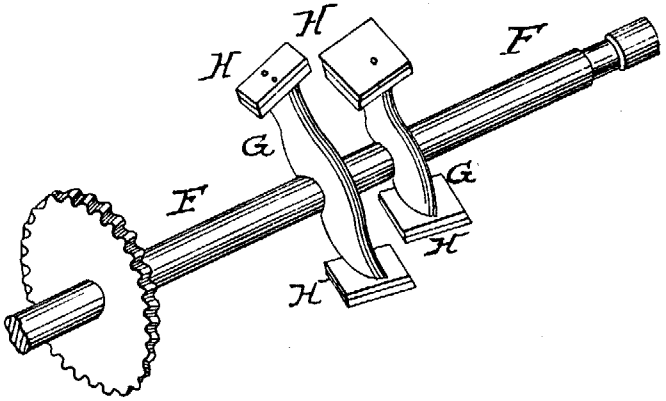
N. PETERS, Photo-Lithographer, Washington, D. C.